US011958605B2

(12) United States Patent
Aintabi

(10) Patent No.: US 11,958,605 B2
(45) Date of Patent: *Apr. 16, 2024

(54) OSCILLATING CANOPY SUNSHADE DEVICE FOR CLIMATE AND SOLAR MITIGATION

(71) Applicant: Vandewater Capital Holdings, LLC, New York, NY (US)

(72) Inventor: Jason Aintabi, New York, NY (US)

(73) Assignee: Vandewater Capital Holdings, LLC, New York, NY (US)

( * ) Notice: Subject to any disclaimer, the term of this patent is extended or adjusted under 35 U.S.C. 154(b) by 290 days.

This patent is subject to a terminal disclaimer.

(21) Appl. No.: 17/514,974

(22) Filed: Oct. 29, 2021

(65) Prior Publication Data

US 2023/0132459 A1    May 4, 2023

(51) Int. Cl.
*B64C 39/02* (2023.01)
*B60L 53/51* (2019.01)
(Continued)

(52) U.S. Cl.
CPC ............ *B64C 39/024* (2013.01); *B60L 53/51* (2019.02); *E04H 9/16* (2013.01); *G05D 1/042* (2013.01);
(Continued)

(58) Field of Classification Search
CPC .... B64C 39/024; B60L 53/51; B60L 2200/10; B60L 2240/62; B60L 2240/66;
(Continued)

(56) References Cited

U.S. PATENT DOCUMENTS 3,337,162 A    8/1967   Bauserman
3,565,368 A    2/1971   Byron
(Continued)

FOREIGN PATENT DOCUMENTS

CA        2829781 A1    9/2012
CN      105626375 A     6/2016
(Continued)

*Primary Examiner* — Richard M Camby
(74) *Attorney, Agent, or Firm* — Stephen P. McNamara

(57) ABSTRACT

A sunshade device and management system for mitigating the effects of climate change to help reduce the risk of extinction of plants, animals, and humans. The sunshade device has a canopy, which will collapse when lifted into the atmosphere by lifting devices, and open when the lifting devices are turned down or off, to provide shade. The canopy is preferably formed of a flexible lightweight solar panel film containing solar cells, which charge a battery power system which operates electrically powered propeller-driven lifting devices attached to a central portion of the canopy. The sunshade management device controls the lifting devices to manage the sunshade device elevation, angle and geolocation. The sunshade management device is provided with artificial intelligence and machine learning whereby it is able to make determinations regarding sunshade device takeoff and shutdown, and positioning of the elevation and angle of the canopy relative to the ground below, to maximize the shade effects of the canopy.

22 Claims, 8 Drawing Sheets

(51) Int. Cl.
*E04H 9/16* (2006.01)
*G05D 1/00* (2006.01)
*H02S 30/20* (2014.01)
*H02S 40/38* (2014.01)
*B64U 10/13* (2023.01)
*B64U 101/00* (2023.01)

(52) U.S. Cl.
CPC .............. *H02S 30/20* (2014.12); *H02S 40/38* (2014.12); *B60L 2200/10* (2013.01); *B64U 10/13* (2023.01); *B64U 2101/00* (2023.01)

(58) Field of Classification Search
CPC ............ B60L 8/003; B60L 50/60; E04H 9/16; G05D 1/042; H02S 30/20; H02S 40/38; H02S 20/23; H02S 20/30; B64U 10/13; B64U 2101/00
See application file for complete search history.

(56) References Cited

U.S. PATENT DOCUMENTS

| | | |
|---|---|---|
| D438,589 S | 3/2001 | Brown |
| D622,896 S | 8/2010 | Bear |
| 8,857,758 B2 | 10/2014 | Al-Garni et al. |
| 9,091,462 B2 | 7/2015 | Ratti et al. |
| 9,775,305 B2 | 10/2017 | Choi |
| 10,151,120 B1 | 12/2018 | Kaneshiro |
| D847,486 S | 5/2019 | Morel |
| D852,489 S | 7/2019 | Morel |
| 10,352,063 B2 * | 7/2019 | Jensen .................... E04H 15/60 |
| 11,708,704 B2 * | 7/2023 | Aintabi .................. E04H 15/04 |
| | | 135/90 |
| 2004/0075411 A1 | 4/2004 | Evans |
| 2011/0315811 A1* | 12/2011 | Al-Garni ................ A45B 23/00 |
| | | 244/30 |
| 2012/0069464 A1 | 3/2012 | Murakami |
| 2015/0240785 A1* | 8/2015 | Chen ...................... F03D 13/20 |
| | | 60/716 |

FOREIGN PATENT DOCUMENTS

| | | |
|---|---|---|
| CN | 105775097 A | 7/2016 |
| GB | 2492806 A | 1/2013 |
| WO | 2018209454 A1 | 11/2018 |

* cited by examiner

OSCILLATING CANOPY SUNSHADE DEVICE FOR CLIMATE AND SOLAR MITIGATION

FIELD OF THE INVENTION

The present invention relates to technology for climate change mitigation, forest fire prevention, and glacial and forest preservation. More specifically, the present invention provides a device and system to provide shade and reflect/absorb solar radiation to reduce ambient temperatures in a selected area on an adaptable and large-scale basis.

BACKGROUND OF THE INVENTION

Climate change has become a significant threat to both the natural environment and man-made structures and practices. Rising temperatures have resulted in melting of the polar ice caps and glaciers, causing rising sea levels. The melting ice caps threaten many major cities, communities, wildlife, and food sources. Higher temperatures have also resulted in increased droughts in parts of the world, impacting food production, but also leading to large accumulations of dead and dried-out plants and trees. Dry plant matter has served as fuel for large devastating fires in many parts of the world, including notably, in California and Australia. Without immediate climate interventions there is a risk of extinction of numerous species of plants, animals, and even of mankind.

Technologies such as green energy generation, carbon capture in fossil fuel power plants, and smart energy grid technologies are just a few examples of approaches that have been developed to combat the global climate crisis issue. These technologies are helpful in controlling worldwide climate change, by reducing carbon dioxide production, and thus reducing a significant driver of climate change. However, such technologies do not provide reduction of warming in particular locations.

A more localized approach for controlling climate change in specific locations is the use of sunshades and other shading technology to reduce solar heating of surface features.

Solar shades provided over surface features such as polar ice caps, glaciers, and the like, will reduce their surface temperatures and decrease their melting rate. Solar shades over open land areas such as forests, plains, and other areas subject to the risk of wild fires, will lower their ambient temperatures, allowing greater moisture retention, thereby reducing the dry fuel available for fires. It has been suggested that limiting a global temperature increase to 1.5° C. will limit glacier melting, limit sea level rise, and limit uncontrollable fires to 35-50% of the effects anticipated from greater temperature increases.

Previously proposed systems have never been successfully implemented in a large scale system. Small scale shades may be useful for urban and suburban environments, and some shade coverings have been used in farming. The use of large-scale, aerially suspended solar shading technology for large areas is extremely challenging due to environmental conditions, such as changing seasons, high winds, storms, and other climate-related events.

Accordingly, there remains a need for technology comprising effective materials that provides large-scale solar shading over significant size areas, capable of adapting to a changing environment and other, often unpredictable, climate events.

SUMMARY OF THE INVENTION

It is an object of the present invention to provide a large-scale sunshade for mitigating solar warming effects in the atmosphere and providing localized shade. It is a further object of the present invention to provide a system for managing the geolocation, elevation and shape of the sunshade and adapting its use to environmental factors.

The device preferably includes a canopy formed of a lightweight, flexible material containing solar cells that generate electricity when the sunshade device is open. In other embodiments, materials such as reflective white or metallized plastic films and reflective metal foils, or fabrics such as reflective white woven and non-woven fabrics may be used. The canopy may form various shapes, but will preferably form symmetric, relatively circular shapes with or without radially extending arms of a consistent length.

The sunshade device is controlled by a sunshade management system. The sunshade management system controls one or more lifting devices provided in a central part of the canopy which periodically are activated to lift the sunshade device to a certain altitude, whereupon the lifting devices are deactivated or turned down to reduce lift, and the sunshade device is opened to provide a slow drifting descent, similar to a parachute, until a minimum altitude is reached, whereupon the lifting devices are activated again. Preferably, air pressure provided on the lower side of the canopy caused by the canopy descent operates to expand the canopy into the fully open position. The sunshade device accordingly repeatedly oscillates in elevation above the earth's surface. The oscillating sunshade device preferably closes up to reduce its area during lifting to reduce drag during periods of ascent, and opens to provide shade and air resistance during periods of descent.

The lifting devices manage the elevation, shape and geolocation of the sunshade device as well as adapting to changing weather patterns and weather-related events. The lifting devices preferably include propellers and other features to help maintain the elevation and angle (pitch) and geolocation (latitude and longitude) of the sunshade device. For example, one or more drone devices may be used as lifting devices. In the preferred embodiments, the canopy constitutes flexible solar panels having solar cells which generate electricity to operate the lifting devices, however, other solar panels may be provided in lieu of or in addition to a flexible solar panel canopy. Appropriate power storage batteries, and power management systems are provided. In one embodiment, the power storage batteries are suspended below the canopy by ropes or wires, or extending arms of the canopy, whereby the weight of the batteries assist in closing up or collapsing the canopy to reduce its area during periods of ascent, and in opening up and retaining the canopy in an open position during periods of descent.

Preferably, a sunshade management system for controlling the elevation and angle (pitch) and/or shape, and geolocation (latitude and longitude) of the sunshade is provided. The sunshade management system preferably employs one or more sensors to record and assess changing weather patterns and other information. The management system is also preferably in electronic communication with the one or more lifting devices. The management system's one or more sensors preferably include information on wind speed, direction, and variation, intensity of the sun's rays and angle of the sun, ambient temperature and humidity, barometric pressure, geolocation and elevation from the earth's surface, temperature and humidity at the earth's surface, precipitation status, levels, and intensity, and other maintenance related information, such as damage to the sunshade's canopy, low-power or malfunctioning lifting devices, etc.

The sunshade management system may then use the information gathered by the one or more sensors and/or other data stored in or received by the management system to change the status of the sunshade device. For example, it is likely to be preferable to collapse and ground the sunshade in the evening and only launch it again after sunrise. Similarly, it is likely to be desirable to collapse and ground the sunshade during rainy days and/or cloudy days, and only launch it again when clouds have cleared. It is also very likely that it will be necessary to collapse and ground the entire device when severe weather-related events, such as thunderstorms, lightning, tornados, hurricanes, etc. are anticipated. When these weather disturbances have passed, the sunshade device may be relaunched.

The management system will therefore control the positioning of the sunshade via the lifting devices, and will hold the sunshade device substantially in place so that it can continue to perform its climate change mitigation functions when conditions are appropriate. However, the management system will be able to ground the sunshade device according to a predetermined schedule, or on an expedited basis when needed due to sudden and severe weather-related events or emergencies. After conclusion of the event or emergency, the management system can evaluate and determine whether to re-elevate the sunshade device.

Some preferable embodiments of the invention may be deployed a short or medium distance from the earth's surface, for example in the troposphere, maximizing operability to provide cover for a particular area of the earth's surface that is an area of concern. The present invention must be adapted to withstand the varying air temperature and pressure and other environmental factors depending on its deployment elevation, as those of skill in the art will recognize.

As those skilled in the art will appreciate, the present invention is not limited to the embodiments and arrangements described above. Other objects of the present invention and its particular features and advantages will become more apparent from consideration of the following drawings and detailed description of the invention.

DETAILED DESCRIPTION OF THE INVENTION

The following detailed description illustrates the technology by way of example, not by way of limitation of the principles of the invention. This description will enable one skilled in the art to make and use the technology, and describes several embodiments, adaptations, variations, alternatives and uses of the invention, including what is presently believed to be the best mode of carrying out the invention. One skilled in the art will recognize alternative variations and arrangements, and the present invention is not limited to those embodiments described hereafter.

Figure 5:
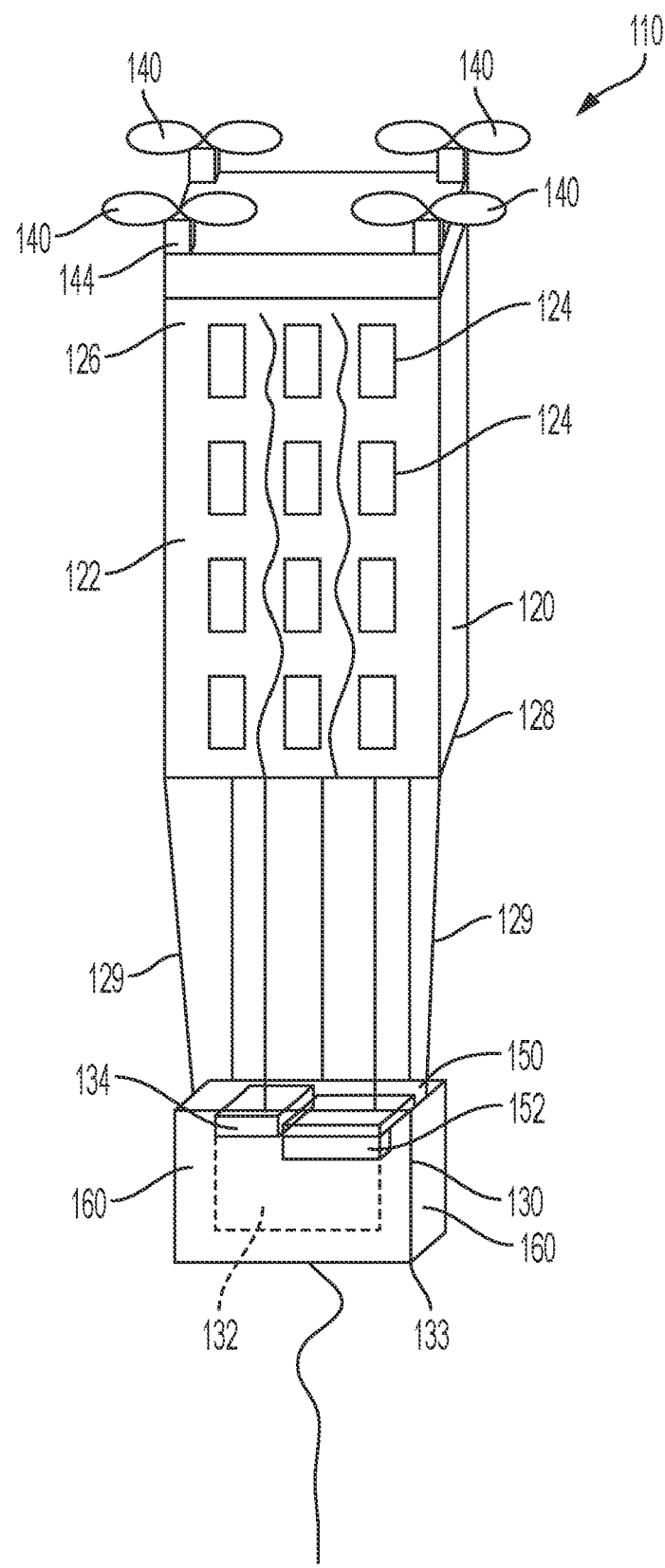
FIG. 5 is a top and side perspective view of a second embodiment of a sunshade device according to the present invention in a collapsed state.
Figure 6:
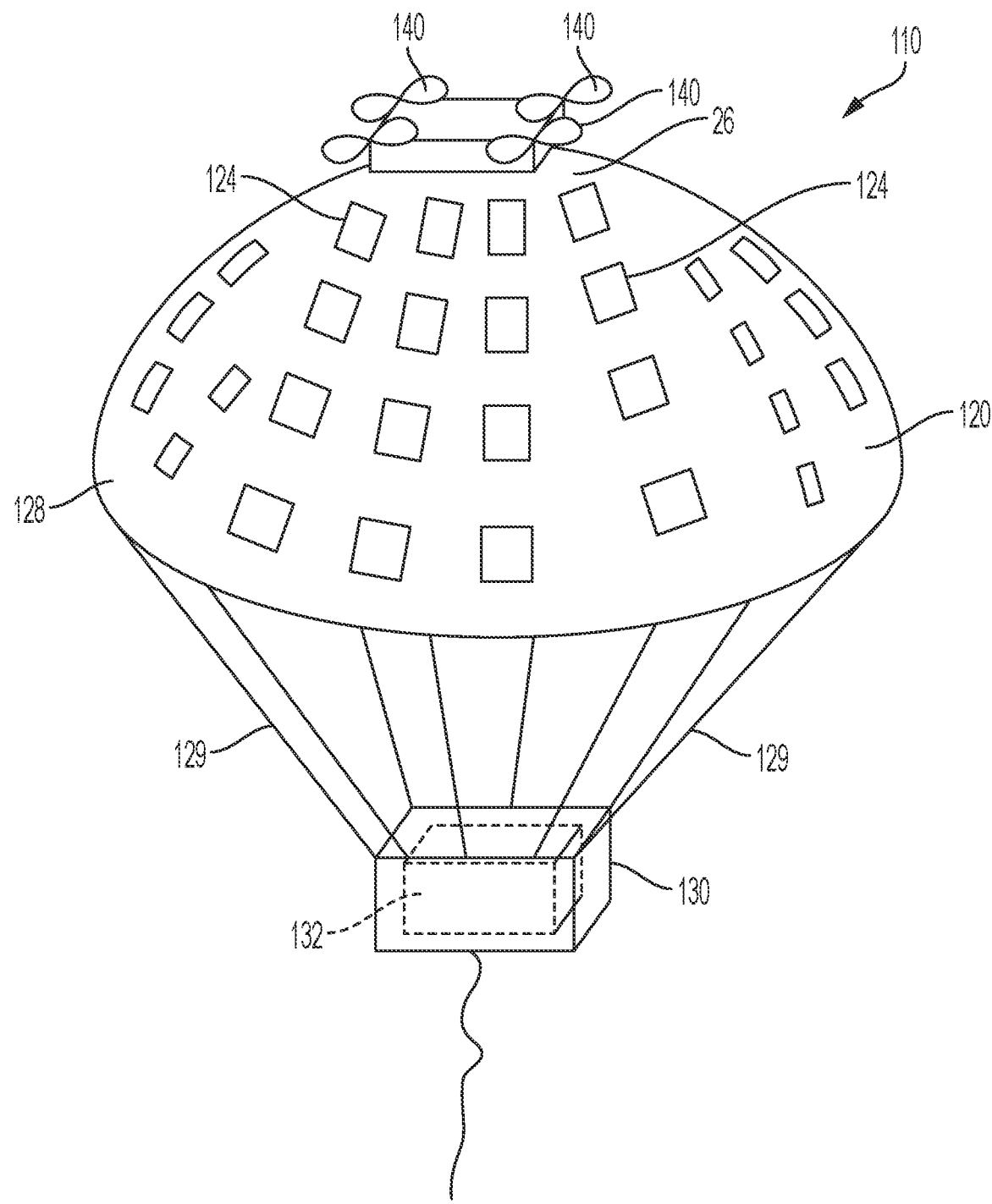
FIG. 6 is a top and perspective view of the sunshade device of FIG. 5 in an open state.
Figure 7:
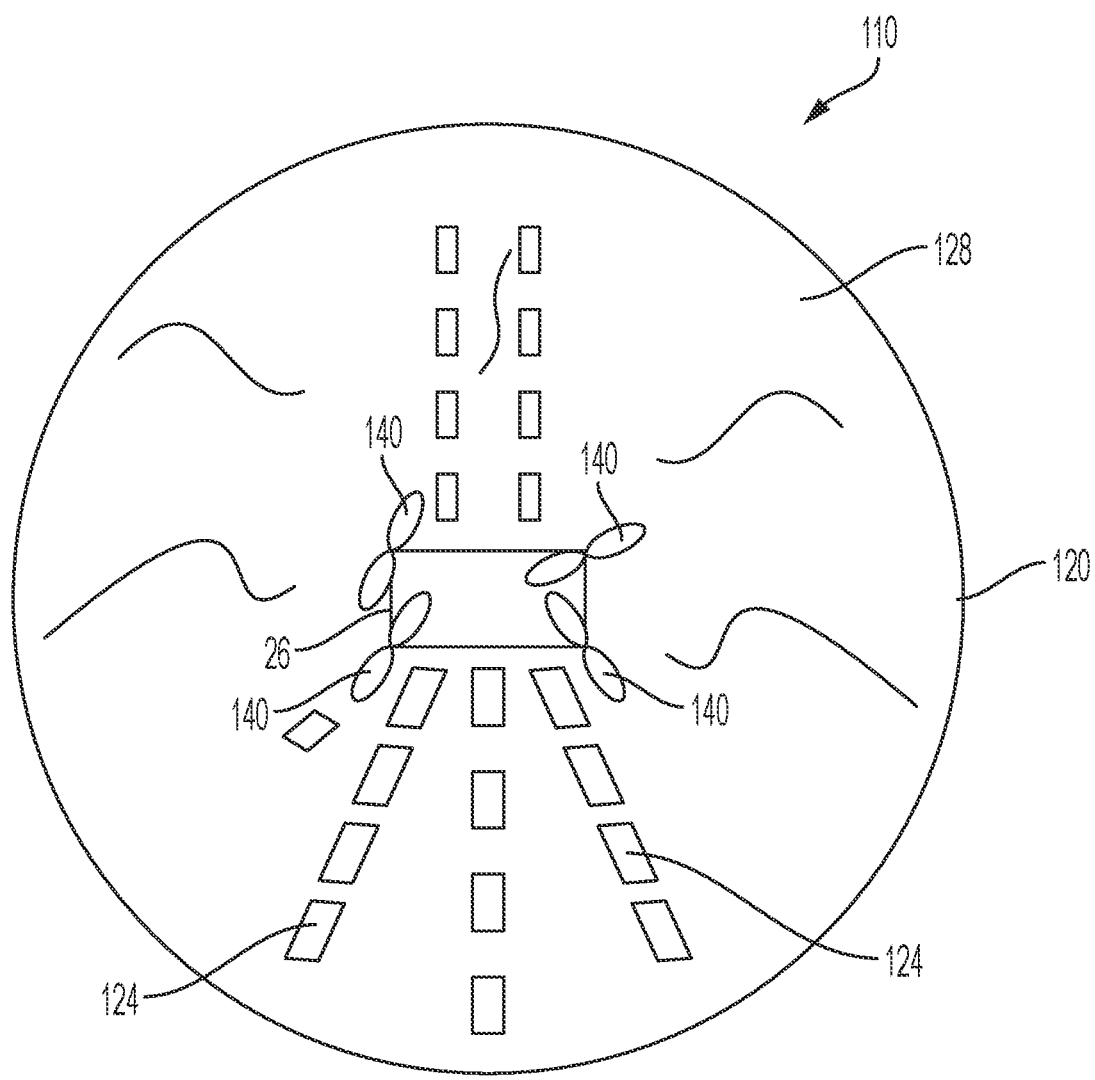
FIG. 7 is a top view of the sunshade device of FIGS. 5-6 laid flat.

Referring first to FIGS. 1-8, two unstructured embodiments of the present invention is shown. In the embodiment shown in FIGS. 1-4, a sunshade device 10 is a generally circular canopy 20 having a plurality of extending arms 21. In FIGS. 5-7 a sunshade device 110 is a generally circular canopy 120.

Sunshade devices 10 and 110 are used to shade a portion of landscape containing a forest or a glacier, cooling the local environment and reducing heating and drying out of forested or glaciated areas. Sunshade devices 10, 110 include, respectively, a canopy 20, 120, for providing shade from the sun, formed of a flexible lightweight sheet material. In some embodiments, canopy 20, 120 is a reflective material and may have tubular channels containing helium or other lighter than air gases to assist with maintaining the canopy's elevation. Materials such as reflective white or metallized plastic films and reflective metal foils are preferred, however, fabrics such as reflective white woven and non-woven fabrics (such as a white fabric or a white knitted material). The canopy 20, 120 may be a solid sheet material or a perforated or otherwise discontinuous sheet material. For example, the canopy may comprise a film, or a perforated film, or a non-woven or knitted white fabric. In some embodiments, canopy 20 is preferably fabricated from, or coated with, a fire-retardant material. In some embodiments, canopy 20 is fabricated from a combination of different materials to provide a laminated sheet having multiple materials providing multiple desired qualities or benefits.

In some embodiments of the invention, a portion or all of canopy 20, 120 is formed of a variable stiffness film material such as described in U.S. Pat. No. 10,257,929 (the disclosure of which is hereby incorporated by reference), which can become stiffer and more rigid upon the application of an electrical charge. In such case, opening of the canopy 20, 120 can be additionally initiated and maintained by providing an electrical charge to the canopy film material.

In preferred embodiments, the canopy 20, 120 is provided with a plurality of solar cells 24, 124 for receiving sunlight and converting it to electrical energy to charge the rechargeable battery power system 30, 130 which powers the sunshade device 10, 110, and in particular its avionics and telematics systems and its electrically powered lifting devices 40, 140 described below. In particularly preferred embodiments, the canopy 20, 120 is fabricated from a flexible solar panel film 22, 122 containing embedded solar cells 24, 124.

Canopy 20, 120 has a central portion 26, 126 and a peripheral portion 28, 128. Canopy 20, 120 is preferably symmetric in shape. In the embodiment of FIGS. 1-4, canopy 20 is generally circular in shape, and has a plurality of canopy arms 21 extending radially from the central portion 26 of the canopy 20. In the embodiment of FIGS. 5-7, canopy 120 is generally circular in shape. In other embodiments, the canopy 20, 120 may be generally square, rectangular, triangular, or other polygonal shapes, or oval or semi-circular or semi-oval or other curved and partially curved shapes. In any case, the canopy 20, 120 may act as a parachute as described in more detail below.

A rechargeable battery power system 30, 130 is operatively connected to the solar cells 24, 124 which charge the battery power system 30, 130 when solar cells 24, 124 are exposed to sunlight. The battery power system includes one or more battery storage units 32, 132 which are preferably a high capacity 12 volt (or higher) battery, sized to deliver sufficient electrical power to an electrically powered lifting device 40, 140 for a sufficient period to lift the sunshade device to a selected altitude, and retain the sunshade device at the desired altitude for a time period of at least 30, 45, 60, 90, 120, 150, or 180 minutes. In other embodiments, the battery storage units may be formed of film materials and made as part of the canopy 20, 120.

Preferably, the one or more battery storage units 32, 132 of the rechargeable battery power system 30, 130 are contained in a container 33, 133 suspended from the peripheral portion 28, 128 of the canopy 20, 120 below the canopy 20 by lines 29, 129. Lines 29, 129 may be formed of cord, rope, wire, or fabric. In the embodiment of canopy 20 shown in FIGS. 1-4, lines 29, 129 can connect to the ends of the arms 21.

The battery power system 30 further includes a battery management system 34, 134 to monitor the battery power and reduce power usage by components of the sunshade device 10, 110 at the direction of a sunshade management system 50, 150 when battery power levels fall below a minimum threshold.

There is at least one electrically powered lifting device 40, 140 attached to the central portion 26, 126 of the canopy. The electrically powered lifting device 40, 140 is preferably a propeller-driven device having rotors or propellers 42, 142. Lifting device 40, 140 may have a single propeller or rotor, or multiple propellers or rotors. In the embodiments shown in the Figures, four rotors 42, 142 are shown (e.g. a quadcopter drone embodiment) but anywhere from one to twenty rotors may be used. The number and size of each rotor 42, 142 may be selected depending on the size of the sunshade device 10, 110 and its weight to be lifted. The preferred embodiment is expected to be a single quadcopter arrangement, however, potentially 1, 2, or 4 quadcopter arrays could be used.

The rotors 42, 142 are driven by appropriately sized electrical motors 44, 144. The at least one lifting device 40, 140 is operatively connected to the rechargeable battery power system 30, 130 to drive the electrical motors 44, 144 when directed by the sunshade management system 50, 150.

Appropriate aircraft warning lights are provided on the lifting device 40 and the peripheral portion 28 of canopy 20, 120, and potentially, elsewhere on the canopy 20, 120 and on the container 33, 133. Typical blinking red lights may be used to provide visibility to the sunshade device 10, 110, both when it is airborne and grounded.

Quadcopter (also known as quadrotor) drone technology is very well developed at this time, and in one preferred embodiment, the lifting device 40, 140 and parts of the control systems of the sunshade management system 50, 150 are implementations of known quadcopter concepts. Quadcopters generally have four rotors, two rotors spinning clockwise and two counterclockwise. The four rotors provide opposing torques, and can be individually manipulated to steer the quadcopter.

There are four primary movements that a quadcopter employs and they are controlled by each of the four rotors. In a typical layout, rotors 1 and 4 rotate clockwise, while rotors 2 and 3 rotate counterclockwise. Yaw is the clockwise or counterclockwise spin of a quadcopter. Yaw is used to rotate left, by operating rotors 1 and 4 propellers at normal speed, and rotors 2 and 3 at high speed. To rotate right, rotors 1 and 4 move at high speed and rotors 2 and 3 move at normal speed. Pitch is used to control the forward and backward movement of a quadcopter. To move forward, rotors 1 and 2 move at normal speed, while rotor 3 and 4 move at high speed. To move backward, rotors 1 and 2 run at high speed while rotors 3 and 4 run at normal speed. Roll is used to cause the quadcopter to bend left or bend right. In order to roll to the left, rotors 1 and 3 run at normal speed while rotors 2 and 4 run at high speed. To roll to the right, rotors 1 and 3 run at high speed and rotors 2 and 4 run at normal speed. Vertical positioning, e.g., ascent and descent are caused, respectively, by operating all rotors at high speed, and by operating all rotors at slower speeds.

Figure 8:
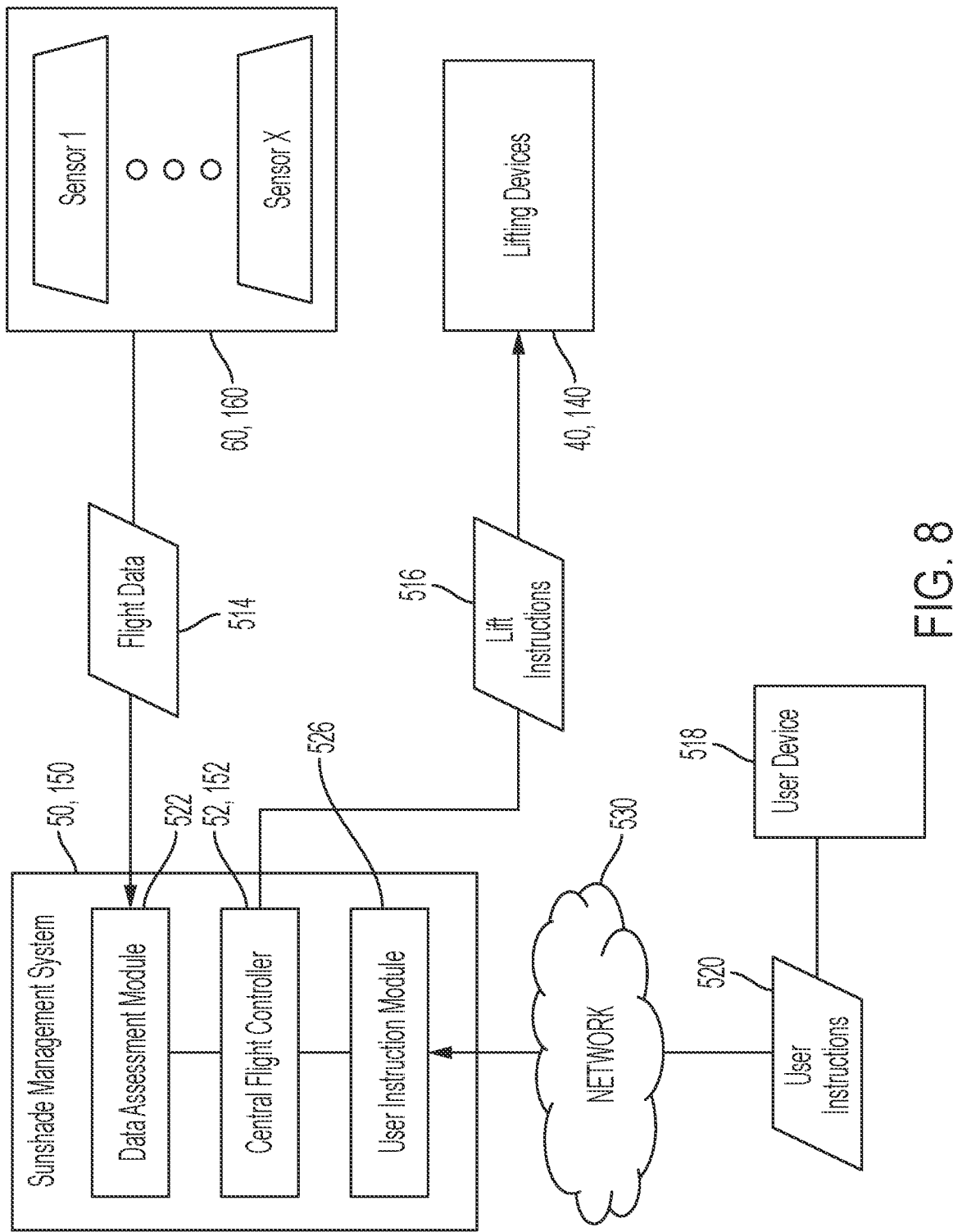
FIG. 8 is a schematic representation of an exemplary sunshade management system according to the principals and embodiments of the present invention depicted in FIGS. 1-7.

FIG. 8 depicts a schematic representation of the sunshade management system 50, 150. Preferable embodiments of the sunshade management system 50, 150 interpret flight data 514 provided by one or more sensors 60, 160 to determine the best positioning for the canopy 20, 120. The one or more sensors 60, 160 may be associated with the container 33, 133 or they may be distributed at various locations on the canopy 20, 120 and lifting devices 40, 140. Additional sensors may be provided at or near the earth's surface.

Figure 1:
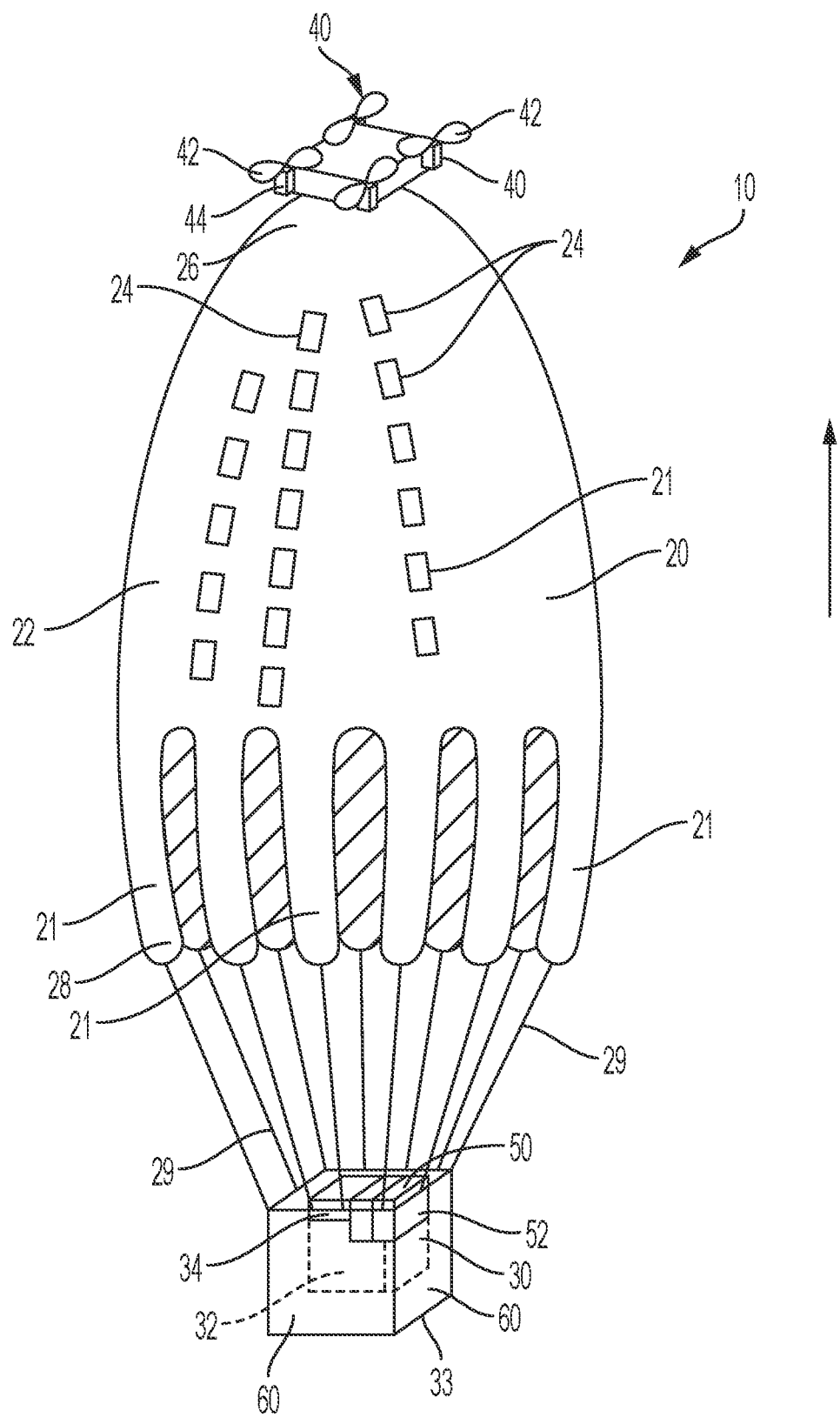
FIG. 1 is a top and side perspective view of an embodiment of a sunshade device according to the present invention in a collapsed state.
Figure 2:
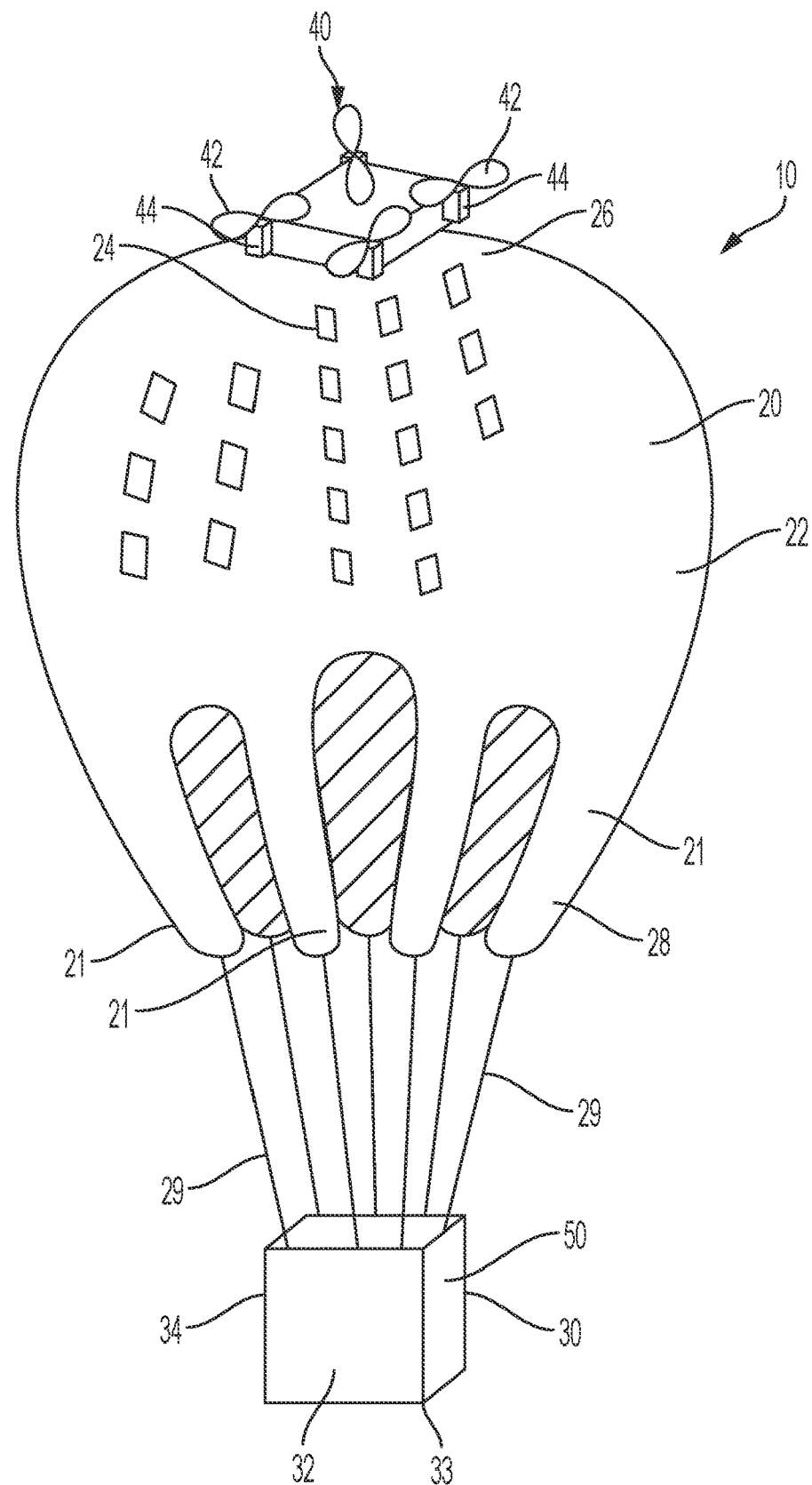
FIG. 2 is a top and side perspective view of the sunshade device of FIG. 1 transitioning to an open state.
Figure 3:
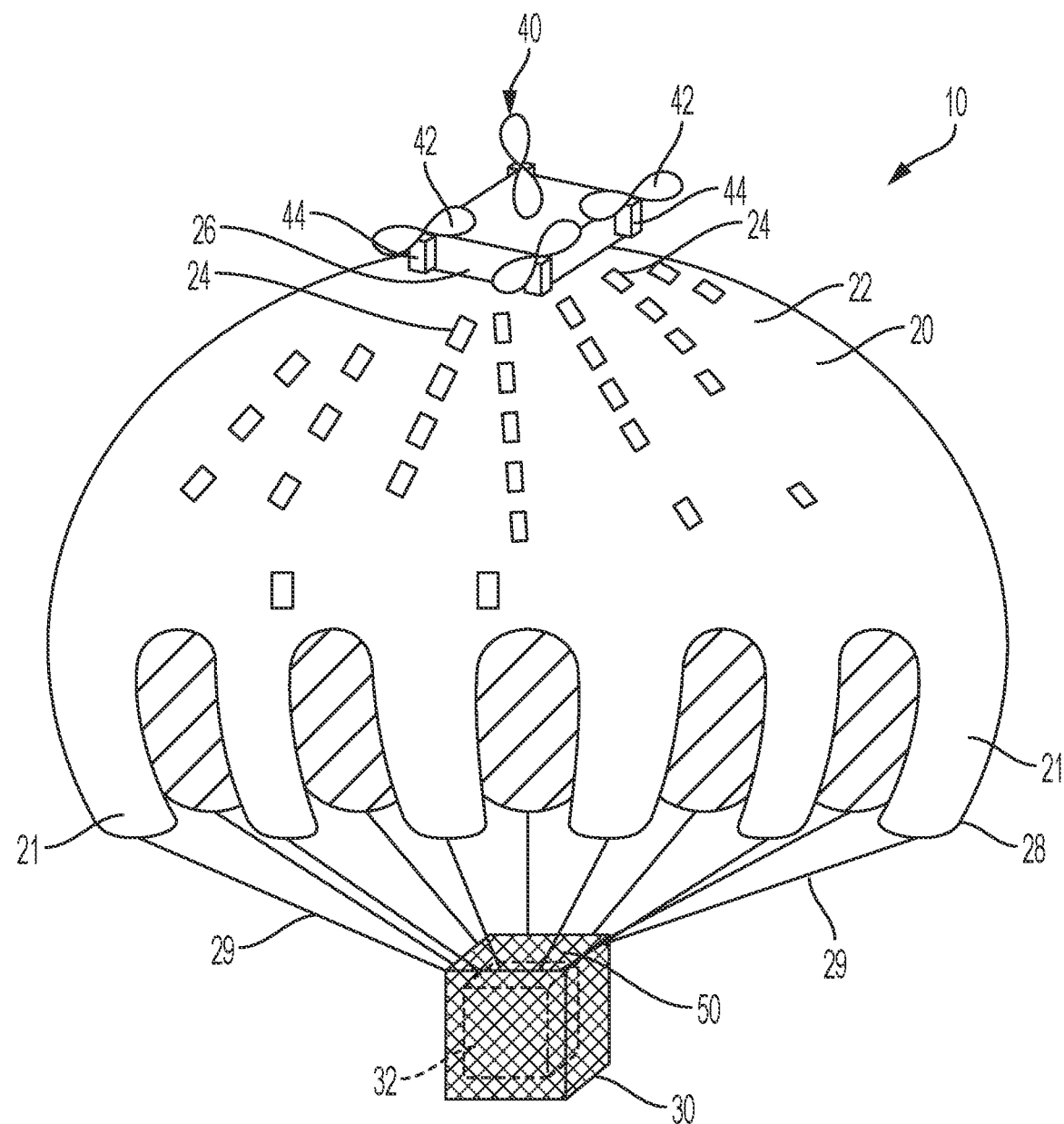
FIG. 3 is a top and perspective view of the sunshade device of FIGS. 1-2 in an open state.
Figure 4:
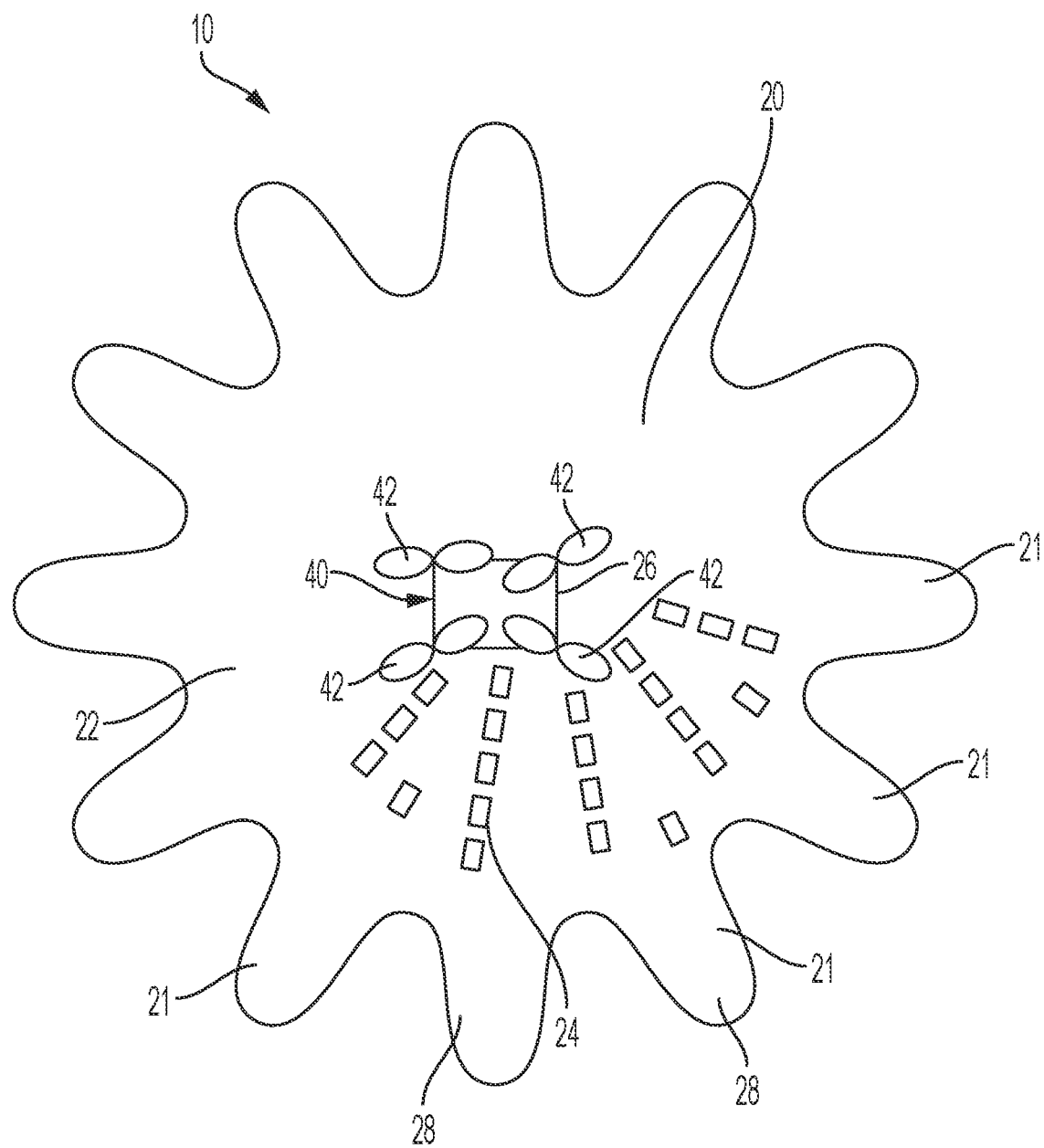
FIG. 4 is a top view of the sunshade device of FIGS. 1-3 laid flat.

Sunshade management system 50, 150 controls the elevation and angle (pitch) and geolocation (latitude and longitude) positioning of the sunshade device 10, 110 based on flight data 514 provided by one or more sensors 60, 160. Sunshade management system 50, 150 controls the one or more lifting devices 40, 140 to activate them to lift the sunshade device 10, 110 and/or to deactivate or reduce activity of the lifting devices 40, 140 to cause the sunshade device 10, 110 to descend. During lifting of the sunshade device 10, 110, the canopy 20, 120 is collapsed as seen in FIGS. 1 and 5 respectively. Canopy 20, 120 is collapsed by air pressure on the upper surface of the canopy 20, 120 and by gravity, thereby reducing drag during lifting of the sunshade device 10, 110. During descent of the lifting device 10, 110, the canopy 20, 120 is opened by air pressure on a lower surface of the canopy 20, 120, thereby providing shade and increased air resistance during periods of descent. When open, the canopy 20, 120 acts as a parachute to support and slow the descent of the sunshade device 10, 110 as seen in FIGS. 3 and 6 respectively.

In another embodiment (not shown) the lifting devices 40, 140 may cause the canopy 20, 120 to invert during descent. Alternatively, the lifting devices 40, 140 may be mounted in a large aperture in the canopy 20, 120 whereby the lifting devices may pass through the plane of canopy 20, 120 during its oscillation cycle of lift and descent.

Preferably, the sunshade management system 50, 150 is provided with one or more sensors 60, 160 for sensing one or more of the sunshade's altitude, elevation from the earth's surface, air temperature, barometer pressure, humidity, wind speed and direction, GPS signals, solar intensity, solar angle. Data obtained by the sensors allow the sunshade management device 50, 150 to make determinations as to activation and deactivation of the lifting devices 40, 140.

Desirably, the sunshade management system 50, 150 is provided with artificial intelligence and machine learning whereby it is able to make determinations regarding appropriate timing of takeoff and shutdown, and positioning of the elevation and angle of canopy 20, 120 relative to the ground below, to maximize the shade effects of canopy 20, 120.

Sunshade management system 50, 150 activates the lifting devices 40, 140 to lift the sunshade device 10, 110 when a sunshade device altitude measurement is equal to or below a preselected minimum altitude setting. Sunshade management device 50, 150 deactivates or reduces activity of the lifting devices 40, 140 to allow descent of the sunshade device 10, 110 when a sunshade device altitude measurement is equal to or greater than a preselected maximum altitude setting.

In typical embodiments, sunshade management system 50, 150 incorporates a central flight controller module 52, 152 similar to a drone system. The central flight controller includes an Inertial Measurement Unit (IMU), a gyroscope, and satellite positioning (GPS and GLONASS). An accelerometer may be provided to determine orientation relative to the earth's surface. Obstacle detection sensors may be included. The central flight controller receives data from IMU, Gyroscope, GPS modules, accelerometer, and obstacle detection sensors, and using programmed flight parameters and algorithms it calculates speed settings for each rotor, and sends control signals to electronic speed controllers (ESC) associated with each motor.

The central flight controller module 52, 152 may have additional features such as intelligent orientation control (100); signal to the motor ESCs on thrust and direction; intelligent landing gear; auto return to home; multi rotor fail protection; highly sensitive built-in damper IMU module; satellite receiver; and banked turn mode.

Preferable embodiments of the sunshade management system 50, 150 are thus in electronic communication with the lifting devices 40, 140, whether directly or over a wireless connection. Accordingly, the sunshade management system 50, 150 is capable of: controlling the state of collapse or opening of the canopy 20, 120; controlling the elevation and geolocation positioning of the sunshade device 10, 110; and determining if grounding of the sunshade device 10, 110 is necessary due to one or more of weather, safety, and battery power of the sunshade device 10, 110. The sunshade management device 50, 150 preferably performs each of these functions on a continuous, real-time basis and preferably learns from past assessments and instructions to improve its performance over time.

The sensors 60, 160 preferably collect and transmit relevant flight data 514 such as altitude and elevation from the earth's surface, geolocation, GPS signal strength/presence, air temperature, humidity, precipitation, barometric pressure, wind speed and direction, solar intensity and angle, temperature and moisture levels at the earth's surface, and ambient precipitation.

Preferable embodiments of the sensors 60, 160 and sunshade management system 50, 150 also detect and transmit maintenance related data and information, such as damage to the sunshade's canopy 20, 120, low-power or malfunctioning lifting devices 40, 140, etc.

The sunshade management system 50, 150 then uses the data and information collected by and transmitted from the sensors 60, 160 to make real-time determinations about the positioning and effectiveness of the sunshade device 10, 110.

The sunshade management system 50, 150 preferably employs a data assessment module 522 to obtain the flight data 514 and related information from the sensors 60, 160, perform an analysis of the present environment and anticipated future environment based upon the flight data 514, and determine the optimal course of activities for the sunshade device 10, 110. The data assessment module 522 preferably performs these functions on a continuous and real-time basis such that the sunshade management system 50, 150 is constantly reconsidering the optimal placement, shape, etc. for the sunshade device 10.

Using the flight data 514 received from the sensors 60, 160, the data assessment module 522 causes the central flight controller 52, 152 to generate lift instructions 516 and transmit those instructions to the lifting devices 40, 140. The lift instructions 516 can alter the angle or elevation of the sunshade device 10, 110 can reduce the footprint of or ground the sunshade device 10, 110 or re-position or otherwise alter the sunshade device 10, 110. The lift instructions 516 are preferably executed by the lifting devices 40, 140 in real-time such that data is recorded and transmitted by the sensors 60, 160 and analyzed and interpreted by the sunshade management device 50, 150 to generate lift instructions 516, and those lift instructions 516 are then executed by the lifting devices 40, 140 all immediately, continuously, and in real-time.

Thus, for example, the sunshade management device 50, 150 may have the ability to determine when ambient conditions of temperature, sunlight, and humidity are appropriate and sufficient to activate the sunshade device 10, 110 into a flight mode, and similarly, if ambient conditions of temperature, sunlight, and humidity are appropriate and sufficient to discontinue operation of the sunshade device 10, 110 and ground it for the night. In other situations, grounding of the sunshade device 10, 110 is necessary due to one or more of weather, safety, and battery power of the sunshade device 10, 110. In one embodiment, the sunshade device management device 50, 150 has means for receiving weather forecast data and, based on the weather forecast data, controlling the elevation and geolocation positioning, and grounding of the sunshade device In the case of extreme weather events, the sunshade management system 50, 150 may determine that the sunshade 10, 110 should be folded up, grounded, or otherwise protected until the severe weather event ends. In the event of present or imminent severe weather, the sunshade management system 50, 150 preferably acts to protect and preserve the sunshade device 10, 110 by taking appropriate action. Such actions may include collapsing the sunshade device 10, 110 but maintaining its elevation, grounding the sunshade device, or a combination. Such actions may also include moving the sunshade device 10, 110 or increasing or reducing its elevation to avoid the severe weather.

In some preferable embodiments, user input may further be provided over a network. User input may, for example, instruct the sunshade management system 50, 150 to generate lift instructions 516 to form ground the sunshade device 10 for maintenance. The user instructions 520 may be used to improve the efficacy of the sunshade device 10, 110 or for other, non-functional reasons, such as to form a shape in celebration of or as a memorial to a certain event or holiday. Some preferable embodiments of the sunshade device 10, 110 may also display certain messages, colors, patterns, etc. on the underside of the canopy. In such embodiments, the sunshade management system 50, 150 may alter such underside display on the basis of user input.

Some preferable embodiments of the sunshade management system 50, 150 employ a user instruction module 526 to obtain, parse, and communicate the user instructions 520 with the other components of the sunshade management device 50, 150. Such embodiments provide for fluid and optimized functionality of the sunshade management system 50, 150 by compartmentalizing the data analysis and instruction generation functions of the sunshade management device 50, 150.

As previously mentioned, in some preferable embodiments, the sunshade management system 50, 150 is capable of implementing machine learning algorithms to optimize its performance. For example, upon receipt of flight data 514 indicating the presence of extreme weather, the data assessment module 522 may determine a particular course of action that results in a suboptimal result. The data assessment module 522, in such preferable embodiments, is capable of determining that its determination of an optimal course of action was incorrect or was delayed, and will therefore react differently in the future upon receipt of the same flight data 514 indicating the presence of extreme weather. In this way, the sunshade management system 50, 150 performance can be improved the longer the sunshade device 10, 110 remains deployed and the sunshade management system 50, 150 remains active.

Furthermore, in some embodiments, there may be a plurality of sunshade devices 10, 110 in communication with each other to coordinate their actions, for example, one sunshade devices 10, 110 may be descending while a different one is ascending, to thereby optimize positioning and continuity of shade case by the sunshade devices 10, 110. A swarm of autonomously controlled networked sunshade devices 10, 110 can thereby operate independently in remote locations without requiring continuous direct control, which may require on-site or satellite control systems.

The present invention provides a sunshade device 10, 110 which has little to no energy footprint, and which can be strategically deployed to mitigate the harmful effects of climate change over large portions of the earth's surface. Those of ordinary skill in the art will recognize the efficacy of the embodiments described herein for accomplishing the present invention's objectives. While the invention has been described with reference to particular embodiments and arrangements of parts, features, and the like, it is not limited to these embodiments or arrangements. Indeed, modifications and variations included in these teachings will be ascertainable to those of skill in the art.

What is claimed is:

1. A sunshade device, comprising:
    a canopy for providing shade from the sun formed of a flexible lightweight sheet material having solar cells provided thereon and having a central portion and a peripheral portion;
    at least one electrically powered lifting device attached to the central portion of the canopy;
    a rechargeable battery power system operatively connected to the at least one lifting device;
    said solar cells being operatively connected to the battery power system to charge the battery power system;
    a sunshade management system controlling the one or more lifting devices to activate the lifting devices to lift the sunshade device, whereby the canopy is collapsed during lifting of the sunshade device;
    the sunshade management system controlling the one or more lifting devices to deactivate or reduce activity of the lifting devices whereby the sunshade device descends and whereby the canopy is opened during descent of the sunshade device.

2. The sunshade device of claim 1, wherein the sunshade management system activates the lifting devices to lift the sunshade device when a sunshade device altitude measurement is equal to or below a preselected minimum altitude setting.

3. The sunshade device of claim 1, wherein the sunshade management system deactivates or reduces activity of the lifting devices to allow descent of the sunshade device when a sunshade device altitude measurement is equal to or greater than a preselected maximum altitude setting.

4. The sunshade device of claim 1, wherein the canopy is collapsed during lifting of the sunshade device by air pressure on an upper surface of the canopy and by gravity, thereby reducing drag during lifting of the sunshade device.

5. The sunshade device of claim 1, wherein the canopy is opened during descent of the sunshade device by air pressure on a lower surface of the canopy, thereby providing shade and increased air resistance during periods of descent.

6. The sunshade device of claim 1, wherein one or more battery storage units of the rechargeable battery power system are suspended from the peripheral portion of the canopy below the canopy.

7. The sunshade device of claim 1, wherein the canopy is symmetric in shape.

8. The sunshade device of claim 1, wherein the canopy is generally circular.

9. The sunshade device of claim 1, wherein the canopy includes a plurality of canopy arms extending radially from the central portion of the canopy.

10. The sunshade device of claim 1, wherein the at least one lifting device comprises a propeller-driven device.

11. The sunshade device of claim 1, further comprising one or more sensors for sensing one or more of the altitude of the sunshade device, elevation from the earth's surface of the sunshade device, air temperature, barometer pressure, humidity, wind speed and direction, GPS signals, solar intensity, solar angle.

12. The sunshade device of claim 11, wherein the sunshade management system controls the altitude and geolocation positioning of the sunshade device.

13. The sunshade device of claim 12, wherein the sunshade management system determines if grounding of the sunshade device is necessary due to one or more of weather, safety, and battery power of the sunshade device.

14. The sunshade device of claim 12, the sunshade device management system further comprising means for receiving weather forecast data and, based on the weather forecast data, controlling the elevation and geolocation positioning, and grounding of the sunshade device.

15. The sunshade device of claim 1, wherein at least a portion of the canopy is formed of a variable stiffness film material which become stiffer and more rigid upon the application of an electrical charge.

16. A sunshade device, comprising:
    a canopy for providing shade from the sun formed of a flexible lightweight solar panel film containing solar cells and having a central portion and a peripheral portion;
    at least one electrically powered propeller-driven lifting device attached to a central portion of the canopy;
    a rechargeable battery power system operatively connected to the at least one lifting device;
    said solar panel film containing solar cells being operatively connected to the battery power system to charge the battery power system;
    a sunshade management system controlling the one or more lifting devices to activate the lifting devices when a sunshade device altitude measurement is equal to or below a preselected minimum altitude setting to lift the sunshade device, whereby the canopy is collapsed by air pressure on an upper surface of the canopy and by gravity, thereby reducing drag during lifting of the sunshade device;
    the sunshade management system controlling the one or more lifting devices to deactivate or reduce activity of the lifting devices when a sunshade device altitude measurement is equal to or greater than a preselected maximum altitude setting, whereby the canopy is opened during descent of the sunshade device by air pressure on a lower surface of the canopy, thereby providing shade and increased air resistance during periods of descent.

17. The sunshade device of claim 16, wherein the canopy is symmetric in shape.

18. The sunshade device of claim 16, wherein the canopy is generally circular.

19. The sunshade device of claim 16, wherein the canopy is includes a plurality of canopy arms extending radially from the central portion of the canopy.

20. The sunshade device of claim 16, wherein the sunshade management system controls the altitude and geolocation positioning of the sunshade device.

21. The sunshade device of claim 16, wherein the sunshade management system determines if grounding of the sunshade device is necessary due to one or more of weather, safety, and battery power of the sunshade device.

22. The sunshade device of claim 16, wherein at least a portion of the canopy is formed of a variable stiffness film material which become stiffer and more rigid upon the application of an electrical charge.

\* \* \* \* \*